June 2, 1931.  H. S. PAGE  1,808,568
ROTOR FOR DYNAMO ELECTRIC MACHINES
Filed June 12, 1929
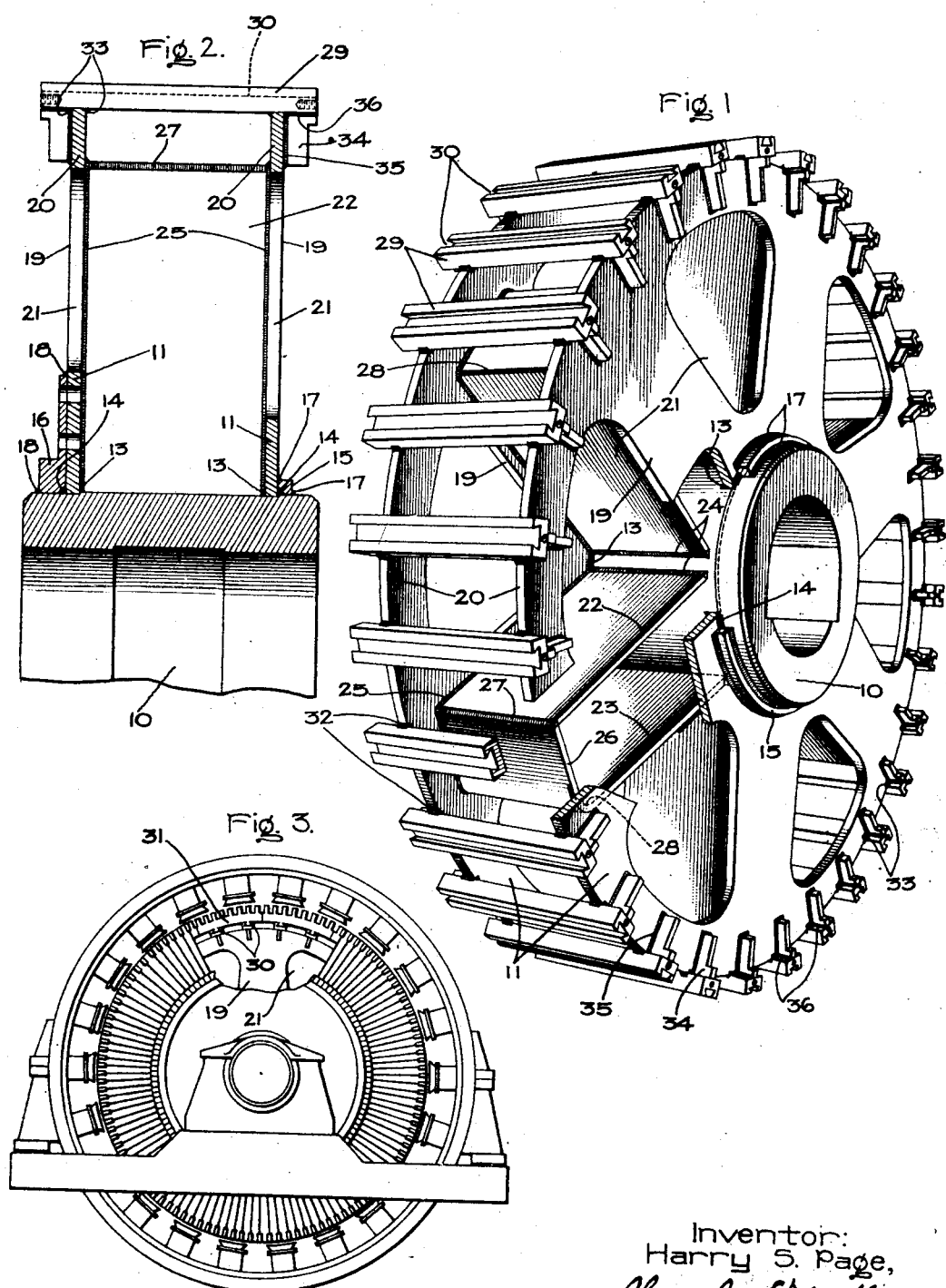
Inventor:
Harry S. Page,
by Charles E. Mullen
His Attorney.

Patented June 2, 1931

1,808,568

UNITED STATES PATENT OFFICE

HARRY S. PAGE, OF SCHENECTADY, NEW YORK, ASSIGNOR TO GENERAL ELECTRIC COMPANY, A CORPORATION OF NEW YORK

ROTOR FOR DYNAMO ELECTRIC MACHINES

Application filed June 12, 1929. Serial No. 370,200.

My invention relates to rotors for dynamo electric machines and has for its object the provision of an improved rotor construction which can be readily fabricated from cut or punched metal plates and bars. I accomplish this by making the rotor of two disks spaced apart axially thereof which are secured together by radially extending spaced plates.

Further objects and advantages of my invention will become apparent as the following description proceeds, and the features of novelty which characterize my invention will be pointed out in the claims annexed to and forming a part of this specification.

In the drawings Fig. 1 is a perspective view of a fabricated rotor embodying my invention; Fig. 2 is a fragmentary axial section of the rotor construction shown in Fig. 1; and Fig. 3 is a view of a dynamo electric machine having a rotor embodying my invention.

Referring to the drawings, the rotor construction, which I have illustrated as an example of one manner of carrying out my invention, includes a hub 10 having disks or members 11 secured thereon and spaced apart axially thereof. These disks are welded to the hub member at 13 and 14 respectively. The strength of the joints which can be obtained by welding in this manner is somewhat limited, and in order to further strengthen the connection between the hub and the disk, I arrange reinforcing rings 15 and 16 on the hub which are welded to the disks and to the hub member at 17 and 18 respectively. The disks or members 11 are each formed with a plurality of arms 19 which are connected by integral rim portions 20. I prefer to form the arms 19 and the rim portions 20 by cutting openings 21 in the disks 11.

The arms 19 of the disks are secured together by radially extending spaced plates 22 and 23 which are welded to the hub member, as indicated at 24, and to the arms 19 at 25. The outer ends of the plates 22 and 23 are connected together by a reinforcing web 26 which is welded to the plate 22 at 27, the web 26 being preferably formed by bending the plate 23 at right angles, as indicated at 28. By this construction a very rigid and simple rotor is produced in which air can circulate through the openings 21 and between the radially extending plates 22 and 23 to facilitate ventilating the machine.

The core structure of the rotor may be secured thereto in any convenient manner, but in this particular instance I prefer to do this by arranging a plurality of axially extending bars 29 about the periphery of the disks 11 which are welded thereto, and which are formed with dovetail slots 30 adapted to receive the rotor laminations, as indicated at 31 in Fig. 3. In order to securely attach the bars 29 to the outer periphery of the disks 11 I arrange the bars to slightly overhang the disks and weld them to the outer periphery of the disks, as indicated at 32, and to the edges of the disks as indicated at 33. I further reinforce this joint by gussets 34 which are welded to the sides of the disks at 35 and to the overhanging portions of the bars at 36.

Modifications of the particular embodiment of my invention which I have disclosed will occur to those skilled in the art, but I do not desire my invention to be limited to the arrangement shown and described, and I intend in the appended claims to cover all modifications which do not depart from the spirit and scope of my invention.

What I claim as new and desire to secure by Letters Patent of the United States is:

1. A fabricated rotor for dynamo-electric machines including disks spaced apart axially of the rotor, means including radially extending spaced plates for securing said disks together, one of said plates having a portion extending peripherally of said disks and attached to the other plate for reinforcing the rotor, and a core structure carried by said disks.

2. A fabricated rotor for dynamo-electric machines including members spaced apart axially of the rotor and having a plurality of arms, means including radially extending spaced plates for securing said arms together, one of said plates having a portion extending peripherally of said members and attached to the other plate for reinforcing the rotor, and a core structure carried by said members.

3. A fabricated rotor for dynamo-electric machines including a hub having members thereon spaced apart axially thereof and welded thereto, reinforcing rings on said hub surrounding the weld between said members and said hub member, said rings being welded to said members and to said hub, said members having a plurality of arms, and means including radially extending spaced plates for securing said hub and said members together, and a core structure carried by said members.

4. A fabricated rotor for dynamo-electric machines including a hub member having disks spaced apart axially thereof and welded thereto, and reinforcing rings on said hub surrounding the weld between said disks and said hub member, said rings being welded to said disks and to said hub member, and a core structure carried by said disks.

In witness whereof, I have hereunto set my hand this 11th day of June, 1929.

HARRY S. PAGE.